H. S. HALLWOOD.
CHART FOR SCALES.
APPLICATION FILED NOV. 14, 1906.
903,711.
Patented Nov. 10, 1908.
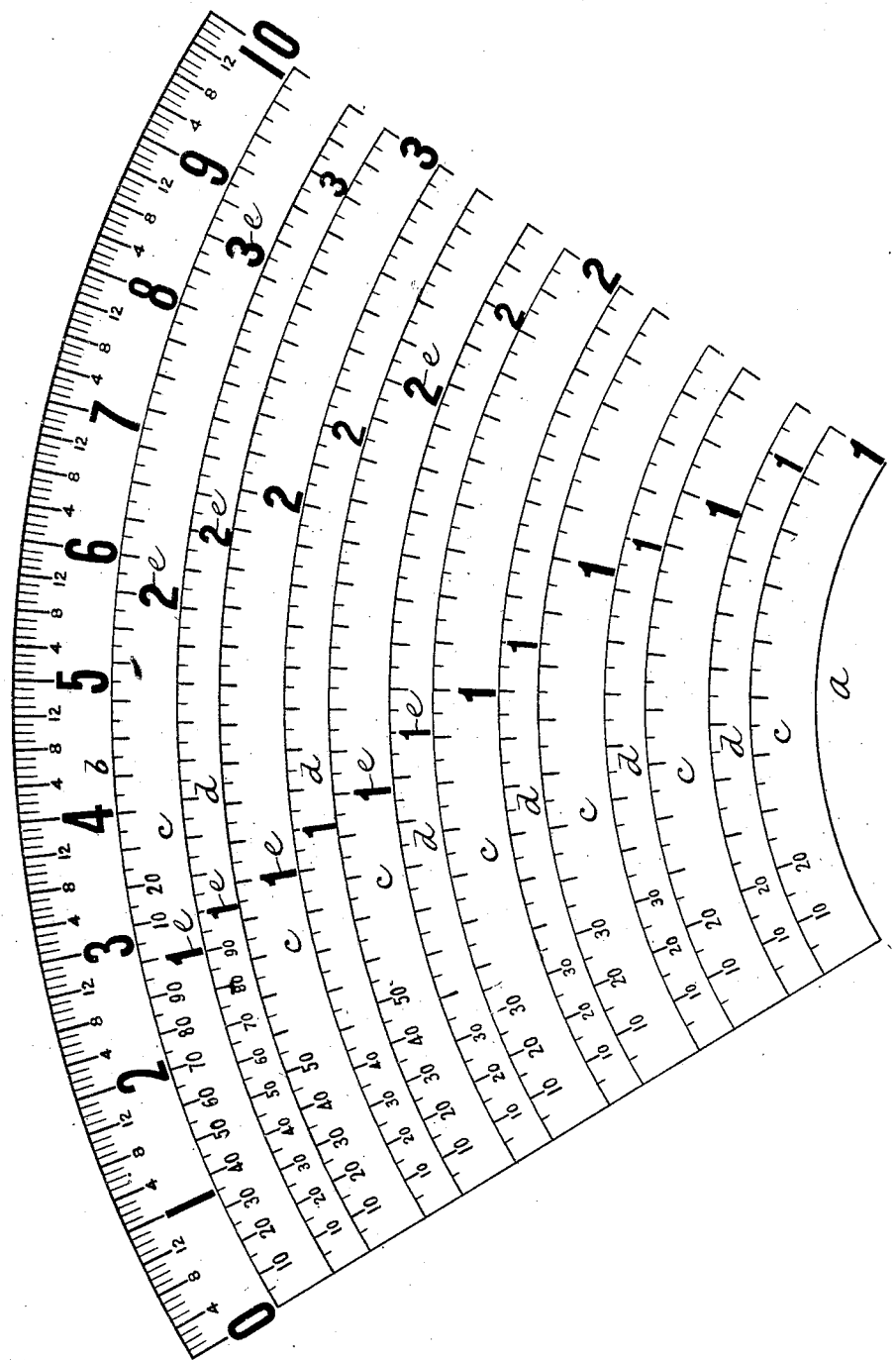
Witnesses:
A. L. Lord
Brennan B. West
Inventor,
Henry S. Hallwood,
by Bates, Fouts & Hull,
Attorneys.

UNITED STATES PATENT OFFICE.

HENRY S. HALLWOOD, OF COLUMBUS, OHIO.

CHART FOR SCALES.

No. 903,711. Specification of Letters Patent. Patented Nov. 10, 1908.

Application filed November 14, 1906. Serial No. 343,329.

*To all whom it may concern:*

Be it known that I, HENRY S. HALLWOOD, a citizen of the United States, residing at Columbus, in the county of Franklin and State of Ohio, have invented a certain new and useful Improvement in Charts for Scales, of which the following is a full, clear, and exact description, reference being had to the accompanying drawings.

My invention relates to charts for computing scales, and has for its object to facilitate the reading thereof.

Charts as ordinarily constructed for use in computing scales are provided with concentric arcs dividing the chart body into concentric spaces, which spaces are provided with graduations and with numerals indicating the values of commodities at different prices per pound (or other unit weight). In all charts with which I am familiar, the concentric spaces are of the same width and the reference numerals are of the same size. In charts which are used with scales of relatively large capacity, it is necessary to provide a large number of such concentric spaces each having a large number of graduations and numerals. As the size of the charts is proportioned to the scales with which they are employed, this necessitates the use of narrow spaces for the accommodation of the graduations and numerals. If proportionally small numerals be employed in these spaces, loss of time is occasioned in reading any computation. On the other hand, if large numerals be employed, there is danger of confusing the numerals on one space with those on an adjoining space, necessitating a loss of the operator's time in avoiding an error in reading.

My invention has for its object to so arrange the concentric spaces and the numerals thereon as to greatly facilitate the reading of the chart without detracting from the capacity or making it of disproportionately large size. I accomplish this result by means of the construction illustrated in the drawing forming part hereof, said drawing showing a front elevation of a chart constructed in accordance with my invention.

In the drawing, *a* represents the chart, the same being of sector shape, adapting it for use with a scale of the pendulum type. This chart is divided by arcs into a series of concentric spaces *b*, *c* and *d*, extending from the bottom or inner portion of the chart to the top or outer portion thereof, and each of these spaces is provided with graduations and numerals. The outermost space *b* is provided with graduations and numerals indicating weight and the spaces *c* and *d* with graduations and numerals indicating the values of various commodities at different prices per unit weight.

For clearness of illustration, I have selected a ten-pound chart, although in practice I may use a chart of greater capacity, as for instance, a twenty-pound chart. The space *b* is sufficiently wide to permit the employment of relatively large and easily-legible numerals. The remaining space (between the outer space *b* and the inner periphery of the chart) is so limited as to prevent the sub-division thereof into a sufficient number of concentric spaces corresponding to all the desirable different rates per pound or other unit weight and at the same time provide each space with large and quickly-legible numerals to indicate the total values corresponding thereto. In charts which I have constructed, this space has been divided into some twenty-eight concentric spaces in order to permit the chart to accommodate the range of prices which obtain in stores handling a varied assortment of commodities. Obviously, it is impossible to make each space of sufficient width to accommodate large numerals thereon without unduly extending the height or length of the chart or causing such juxtaposition of numerals on adjacent spaces as to cause confusion in the reading. I have therefore provided, for the numerals which correspond to the rates at which the majority of commodities are sold, wider spaces than are provided for the numerals which correspond to the rates which are less frequently used. For instance, in the chart which is represented in the drawing, the wide spaces *c* correspond to rates of 10, 12½, 15, 20, 25, 30, and 35 cents per pound.

As previously intimated, in a full size chart, the number of the wide spaces may be increased to accommodate other rates which are frequently used in the sale of commodities. In the spaces *c*, it will be observed that the numerals representing the values of the commodities are larger and more distinct than are the numerals in the narrow spaces *d*. By virtue of the relatively great width of spaces *c*, I am enabled to employ these larger numerals without bringing the same into such juxtaposition to the numerals in the other spaces $d$ as to cause confusion to the operator in distinguishing the particular space which he is reading. As a further means for facilitating the reading of the chart, I employ large numerals $e$ to represent dollars. The length of these numerals is nearly equal to the width of the spaces wherein they are placed and the numerals are larger in spaces $c$ than in spaces $d$ for reasons previously given.

It will be obvious that, by the employment of the wide spaces and the large numerals thereon, the great majority of transactions can be quickly and easily read, while the loss of time incident to the employment of smaller numerals in the narrow spaces which correspond to transactions that are seldom used is negligible.

Having described my invention, I claim:

1. A chart for scales having thereon successive rows of numerals, some of the rows of which are larger than the others, the larger rows being arranged indiscriminately over the chart and being confined to the numerals which are used most frequently, the other rows of numerals, which are used less frequently, being of smaller size, whereby facility of reading is accomplished without the confusion of numerals and without limiting the capacity of the chart.

2. A chart for computing scales having thereon concentric spaces, some of said spaces being of greater width than the others and being arranged indiscriminately over the chart, said spaces being provided with relatively large numerals, the height of which is considerably less than the width of said spaces and which correspond to computations that are most frequently used, the remaining spaces being of considerably less width than the others and being provided with relatively smaller numerals which correspond to computations which are infrequently used, whereby facility of reading the ordinary computations is accomplished without confusion through the juxtaposition of the numerals on different spaces.

In testimony whereof, I hereunto affix my signature in the presence of two witnesses.

HENRY S. HALLWOOD.

Witnesses:
H. P. MILLER,
C. LINDSAY BOGGESS.